United States Patent [19]
Bajracharya et al.

[11] Patent Number: 5,922,381
[45] Date of Patent: Jul. 13, 1999

[54] PREPARATION OF FILLED PASTAS

[75] Inventors: Rupak Bajracharya, Newtown; Janice Baker, New Milford; George Cherian, New Milford; Louise Barbara Wyant, New Milford, all of Conn.

[73] Assignee: Nestec S.A., Vevey, Switzerland

[21] Appl. No.: 08/922,266

[22] Filed: Sep. 2, 1997

[51] Int. Cl.⁶ .............................. A23L 3/34; A23L 3/348
[52] U.S. Cl. .................... 426/321; 426/335; 426/496; 426/502; 426/508; 426/521; 426/532; 426/557
[58] Field of Search ................... 426/335, 508, 426/521, 502, 496, 532, 557, 11, 321

[56] References Cited

U.S. PATENT DOCUMENTS

| | | | |
|---|---|---|---|
| 2,434,388 | 1/1948 | Brehm | 426/557 |
| 4,898,744 | 2/1990 | Liggett et al. | 426/557 |

FOREIGN PATENT DOCUMENTS

| | | | |
|---|---|---|---|
| 45-16769 | 12/1966 | Japan | 426/158 |
| 61-149060 | 11/1986 | Japan . | |

OTHER PUBLICATIONS

P. Giavedoni et al., "Beitrag zur Sicherheit und Haltbarkeit von frischen gefulten Teigwaren, abgepackt in modifizierter und in einer Athanol–Gas–Atmosphare," Flesischwirtschaft, vol. 74, No. 6, 1994, pp. 639, 640 and 643–646. (English abstract attached).

M.V. Simpson et al., "Challenge Studies with *Clostridium botulinum* in a Sous–Vide Spaghetti and Meat–Sauce Product," Journal of Food Protection, vol. 58, No., 3, 1995, pp. 229–234.

*Primary Examiner*—Helen Pratt
*Attorney, Agent, or Firm*—Pennie & Edmonds LLP

[57] ABSTRACT

A process for the production of a pre-cooked, high moisture, shelf-stable or refrigerated acidified filled pasta having a filling within a dough skin which includes mixing pasta ingredients together to form a pasta dough, sheeting the dough to a sheet to form the skin of the filled pasta, encasing a filling having a water activity of from 0.93 to 0.97 and a pH of from 4.6 to 5.6 within the dough sheet to give a raw filled pasta, cooking the raw filled pasta in acidified water to a pH of 4.6 to 5.6 and a moisture content of from 45% to 65% by weight and a water activity of 0.94 to 0.995, and finally packaging the cooked pasta either with heat processing or under modified atmospheric conditions.

9 Claims, No Drawings

PREPARATION OF FILLED PASTAS

FIELD OF THE INVENTION

The present invention relates to the preparation of filled pastas and more particularly to the preparation of pre-cooked, high moisture, shelf-stable or refrigerated, acidified filled pasta products.

BACKGROUND OF THE INVENTION

Traditionally, shelf-stable or refrigerated pre-cooked/acidified regular pastas (e.g. spaghetti, linguine, penne, etc.) are prepared by boiling pastas (raw/wet or dried) in acidified water, coating with oil followed by packaging and heat processing with steam or boiling water (for example, a product temperature of 90°–95° C. for about 10–20 minutes). In some cases, the pasta products are sterilized at higher temperatures (for example 104° C.) using a shorter processing time. The cooked pasta usually has a moisture content of from about 55 to 70% by weight. Various kinds of acids and combinants are used in the pasta acidification process as a hurdle to ensure microbiological stability to obtain a pH typically between 3.9 to 4.6, preferably from 4.1 to 4.5 and more preferably from 4.2 to 4.4.

However, acid perception is commonly recognized in the acidified pasta. In the case of filled pasta products such as ravioli, tortellini, etc., most fillings accentuate the acidic notes and the product tends to become almost inedible at a pH lower than 4.6.

SUMMARY OF THE INVENTION

We have developed a process for the preparation of pre-cooked, high moisture, shelf-stable or refrigerated, acidified filled pasta products in which the combined water activity is close to 0.97 and the combined moisture content is around 48–50%, wherein a shelf-stable pasta having a pH of as low as 4.6 may be obtained with an acceptable taste. The filled pasta of the present invention is not a "ready to eat" pasta but it requires a warm up time either by cooking in boiling water or any other method of heating such as microwaving prior to consumption.

Accordingly, the present invention provides a process for the production of a pre-cooked, high moisture, refrigerated, acidified filled pasta comprising a filling within a dough skin which comprises mixing pasta ingredients together to form a pasta dough, sheeting the dough to a sheet suitable to form the skin of the filled pasta, encasing a filling having a water activity of 0.93 to 0.97 and a pH between 4.6 to 5.6 within the dough sheet to give a raw filled pasta, cooking the raw filled pasta in acidified water to a pH of from 4.6 to 5.6 and moisture content of from 45 to 65% by weight and a water activity of 0.94 to 0.995, and finally packaging the cooked pasta either with heat processing or under modified atmospheric conditions.

DETAILED DESCRIPTION OF THE PREFERRED EMBODIMENTS

The pasta dough may be prepared from a farinaceous ingredient and water, with or without one or more additives. The farinaceous ingredient may be one or more of durum semolina, rice flour, buckwheat flour, durum flour, regular wheat flour, whole wheat flour, farine flour, or corn flour, or any mixture thereof. Generally, durum or wheat flour are preferred. The farinaceous ingredient is usually present in an amount of from 70 to 95% of the dry ingredient mixture, with amounts of between 80–90% by weight of the dry mix being preferred. The amount of water present in the dough is normally from 15 to 35% by weight based on the total weight of the dough.

Wheat gluten or corn gluten is typically included in the dry ingredient mix at a level of about 2 to 20% by weight of the dry mix, with amounts between 5% and 10% being preferred, to increase the protein content of the pasta thereby increasing its strength and firmness. Dehydrated egg material such as dried egg white, dried eggs and dried yolks and/or liquid whole eggs, may if desired, be included in the ingredient mix at levels up to about 22% by weight of the dry ingredient mix. In addition, glyceryl monostearate may, if desired, also be included in the ingredient mix. If used, the glyceryl monostearate preferably is present in amounts of from 0.5 to 5% by weight of the dry ingredient mix. It is to be understood that wheat gluten, eggs, and glyceryl monostearate are optional ingredients in the dry mix and are not essential in the production of the pasta component.

If desired, colorants, seasonings, spices or flavorings such as meat, chicken or beef flavors may be added to the pasta dough, e.g. in amounts of from 0.1 to 5% by weight based on the total weight of the pasta.

The pasta dough may be formed into a sheet by sheeting or extrusion. The pasta dough is preferably sheeted to a thickness of from about 0.03 to 0.07 inches, preferably from 0.04 to 0.06 inches. The pH of the pasta dough sheet may be as high as 5.6 and preferably from 4.8 to 5.4. If desired, the dough sheet may be acidified to a pH of less than 5.6 by boiling, dipping or spraying in acid or by adding to the dough ingredients before sheeting. Examples of acids which may be used are food acceptable acids including organic acids such as lactic, fumaric, malic acid or gluconic acid lactone.

The filling may be any desired filling for use in a filled pasta, e.g. a conventional filling such as a cheese filling, a meat filling, a vegetable filling or a tomato-based filling. The pH of the pasta filling may be as high as 5.6 preferably from 4.8 to 5.4 and especially from 4.9 to 5.2. To obtain a pH of less than 5.3, it may be necessary to acidify the filling. Examples of acids which may be used are food acceptable acids including organic acids such as lactic, fumaric, malic acid or gluconic acid lactone. The pH of the filling is preferably from 4.8 to 5.4.

After encasing the filling within the dough sheet to give a raw filled pasta, the seams where the edges of the dough sheet meet are preferably sealed, e.g. by coating with an egg wash.

The raw filled pasta is cooked in acidified water to obtain the desired moisture content, preferably from 48 to 60% for from about 3 to 15 minutes, preferably from 4 to 9 minutes. The water activity is preferably from 0.96 to 0.98. If the dough sheet has not been preacidified, the pasta can be cooked in acidified water by different methods, e.g. hot water, steam/water spraying, etc. In a continuous operation, it will be cooked in a blancher with steam/water using acidified water. Examples of acids which may be used are food acceptable acids such as lactic, fumaric, malic acid or gluconic acid lactone. The acid concentration is preferably from about 0.1 to 1.0%, especially from 0.2 to 0.75% by weight. The pH of the cooked pasta may be as high as 5.5, preferably from 4.8 to 5.3 and especially from 4.9 to 5.2.

Cooking the raw filled pasta to a moisture content of from about 45 to 65% by weight is necessary to gelatinize the starch and also to facilitate rehydration during the reheating prior to consumption.

Before packaging, the pastas are advantageously coated with edible oil to inhibit sticking. The oil may advantageously be coated onto the pasta by spraying. The oil should have a melting point below 40° C., preferably below 35° C. and is advantageously a vegetable oil, e.g. soybean oil, peanut oil, olive oil, sunflower oil, safflower oil, canola oil or any combination thereof. The amount of oil coated onto the pasta may be from about 0.5 to 8%, preferably from 1 to 5% and especially from 1.5 to 3% by weight based on the weight of the pasta.

The pastas are finally packaged in suitable containers, e.g. cans, glass jars or plastics pouches. After sealing, the containers may be heat processed to pasteurize the product and render it shelf-stable. In accordance with the present invention, the containers may be heat processed under atmospheric conditions which provide a sterilizing value equivalent to 10 minutes at 93° C. For example, a commercially pasteurized product may be produced by processing the sealed containers for from about 10–20 minutes in hot water or steam at about 90°–95° C. Upon completion of heat processing, the containers are rapidly cooled to a temperature of about 45° C. or below in order to preserve the texture of the products.

Alternatively, after sealing, the pastas are pasteurized and packaged under modified atmospheric conditions. The modified atmosphere may comprise nitrogen alone or a mixture of nitrogen and carbon dioxide as is conventionally used, e.g. a ratio of $N_2$ to $CO_2$ of 80:20, 65:35 or 50:50.

The filled pastas produced by the process of the present invention may be stored at refrigerated temperatures and are shelf stable at ambient temperatures over long periods and have excellent organoleptic qualities.

EXAMPLE

The following Example further illustrates the present invention. Parts and percentages are given by weight unless otherwise stated.

Example 1

Cheese ravioli filling is acidified with 0.9% lactic acid to a pH of 5.2 and then encased in a pasta dough sheet having a thickness of 0.034 inches. Egg wash is used to seal the edges and the raw ravioli is cooked in 0.4% lactic acid solution for 5 minutes to a moisture content of 50%. The product is then oil coated with 1% by weight of soya oil based on the weight of the pasta and then sealed in a pouch under modified atmosphere (100% nitrogen). The samples are then autoclaved at 97° C for 30 minutes and stored at refrigeration temperature. The pH is 5.2 and water activity 0.97. The product had a total plate count of less than 100, yeast and mold<100 even after six month storage.

What is claimed is:

1. A process for the production of a pre-cooked, high moisture, shelf stable or refrigerated, acidified filled pasta having a non-acidic taste and comprising a filling within a dough skin, the process consisting essentially of mixing pasta ingredients together to form a pasta dough, sheeting the dough to a sheet having a pH greater than 4.6 suitable to form the skin of the filled pasta, encasing a filling having a water activity of from 0.93 to 0.97 and a pH of greater than 4.6 within the dough sheet to give a raw filled pasta, cooking the raw filled pasta in acidified water to a pH of at least 4.6 to a moisture content of from 45 to 65% by weight and a water activity of from 0.94 to 0.995 to form a filled pasta having a non-acidic taste, and finally packaging the cooked pasta either with heat processing or under modified atmospheric conditions.

2. A process according to claim 1 wherein the pasta dough is formed into a sheet by sheeting or extrusion.

3. A process according to claim 1 wherein the pasta dough is sheeted to a thickness of from about 0.03 to 0.07 inches.

4. A process according to claim 1 wherein the filling is a cheese filling, a meat filling, a vegetable filling or a tomato-based filling.

5. A process according to claim 1 wherein to obtain a pH of less than 5.6, the filling is acidified.

6. A process according to claim 1 wherein the pH of the filling is from 4.6 to 5.6.

7. A process according to claim 1 wherein the raw filled pasta is cooked in acidified water to obtain a moisture content of 48 to 60% for from 3 to 15 minutes.

8. A process according to claim 1 wherein the acid used is lactic, fumaric, malic acid or gluconic acid lactone.

9. A process according to claim 1 wherein the water activity of the cooked pasta is from 0.96 to 0.98.

* * * * *